Patented Sept. 10, 1940

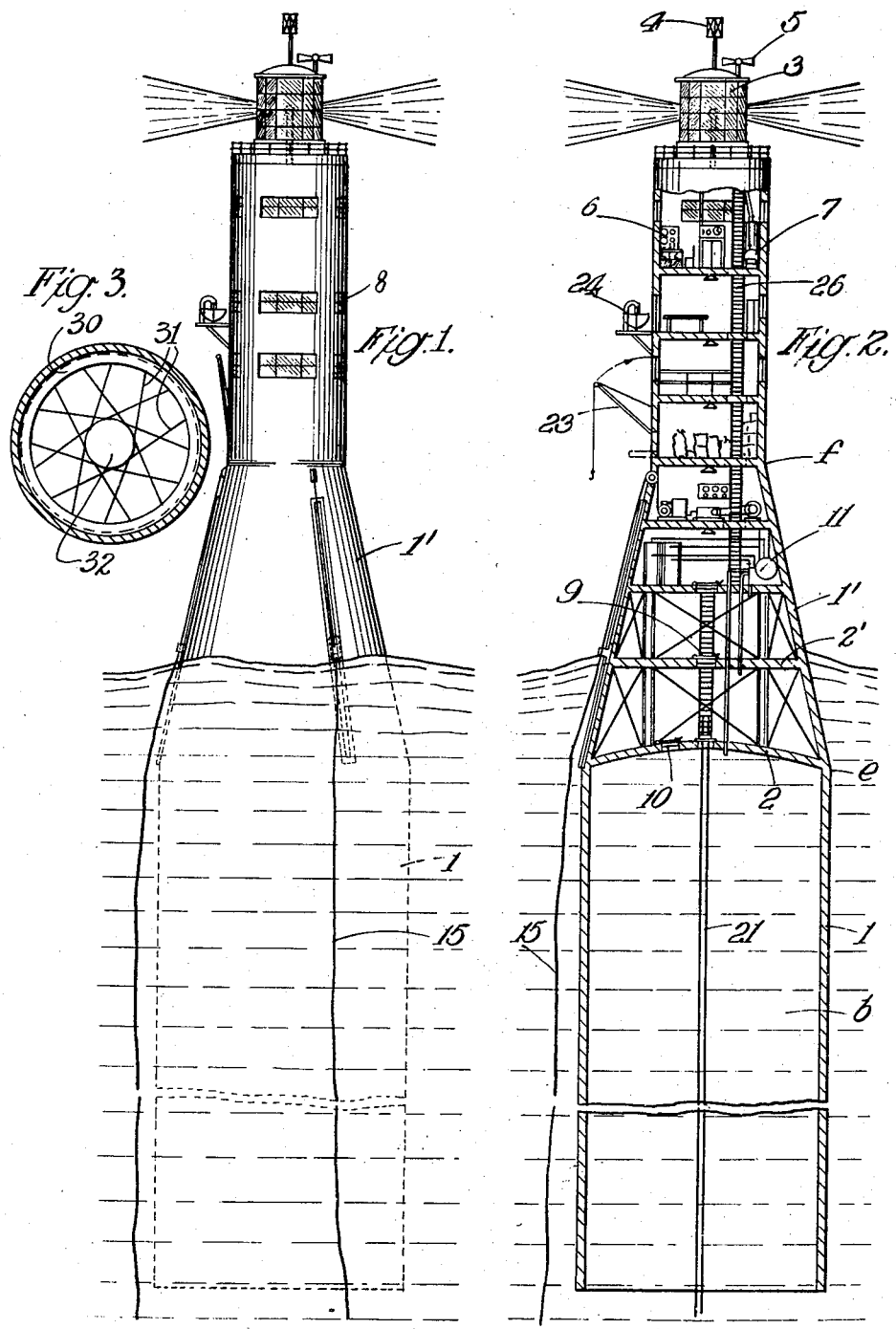

2,214,453

UNITED STATES PATENT OFFICE 2,214,453

FLOATING STRUCTURE

Frederick George Creed, Croydon, England, assignor to Floating Stations Limited, London, England, a British company Application February 11, 1939, Serial No. 255,831
In Great Britain August 30, 1938

4 Claims. (Cl. 9—8.3)

This invention relates to floating structures intended to be anchored in deep water or in the sea.

The chief object of the invention is to provide a novel structure, which is especially suitable for use as a deep water relay station, a light ship, a visual or radio beacon and a variety of other uses which is inherently stable, i. e. will always tend to float vertically, and which is substantially immobile, i. e. will suffer little change of position due to wave movement.

A further object of the invention is to provide such a structure which is relatively inexpensive to construct, which is simple to assemble and which may be at least in part renovated or repaired whilst still anchored in its position of use.

With these and other objects in view, the floating structure, according to the present invention, essentially comprises an elongated cylinder or tube divided by a transverse wall or partition into two unequal lengths of which the smaller constitutes a buoyant chamber and is only partially submerged whilst the larger is open-ended and wholly submerged and is nearly or entirely filled with water, such that the tube floats vertically and only suffers change of buoyancy due to sub-surface waves, pressures acting on the buoyant chamber through the column of water enclosed by the open-ended portion thereof.

According to a further feature of the invention, the cylinder or tube in the region of the surface of the water is of decreasing cross-sectional area or diameter.

Water is allowed to rise in the open end of the tube to an extent determined by the position of the transverse wall or partition, but an amount of air may, in some cases, be trapped below the transverse wall or partition in order to provide a cushioning and/or damping effect on the column of water enclosed by the tube.

The cylinder or tube may be of any convenient cross-section, preferably circular, with parallel walls throughout the greater part of its length and desirably offers a smooth uninterrupted surface to the surrounding water. It may be of any desired length, but preferably the submerged compartment extends downwards into deep quiet water, i. e. some two or three hundred feet in the ocean and to a lesser depth in shallower waters. In this way, as wave pressures cannot act through the walls of the tube or cylinder, the vertical component of the sub-surface waves is only effective on the column of water enclosed by the tube. It is well known that the height of a sub-surface wave decreases as the depth increases, but it is not generally realised that the height of the sub-surface wave is the measure of the change of "head" or change of static pressure at any given depth, and it is this change of static pressure much more than any vertical movement of the water which reacts upon the cylinder to produce changes of buoyancy, the dynamic effect of this vertical movement being negligible. Thus the vertical movement so imparted to the cylinder is only equal to a small proportion of the height of the surface wave. For example, a 30 ft. surface wave might produce at 200 ft. a sub-surface wave of only about 3½ ft. and, therefore, the vertical movement of the cylinder or tube would be correspondingly small. When an amount of air is trapped and compressed between the surface of the column of water and the transverse wall or partition this air acts as a buffer and damps the movements of the column of water as the elasticity of the air has to be taken up before movement is carried to the buoyant chamber.

Increased degree of immobility is obtained when the cross-sectional area or the diameter of the cylinder or tube decreases in the region of the surface of the water. In this case, it is preferred that the maximum cross-sectional area or diameter be situated at a depth lower than the deepest wave trough likely to be encountered and the minimum cross-sectional area or diameter be situated at a height somewhat higher than the highest wave likely to be encountered. The maximum and minimum areas will be approximately equal distances above and below the normal surface level. The effect of this arrangement is that the increase in upward pressure on the transverse wall or partition is balanced or offset by an increase in the pressure of the water on the sloping surface during the passage of a wave. In other words, as the wave rises it reduces the above water surface area and, therefore, increases the downward pressure on the structure, the effect of which is counteracted by the upward pressure acting on the transverse wall or partition through the column of water due to the sub-surface wave.

In order that the invention may be clearly understood and readily carried into effect, two constructions are hereinafter more fully described by way of example and with reference to the accompanying more or less diagrammatic drawing, in which:

Figure 1 is an elevation of one form of floating station,

Figure 2 is a section through the structure,

Figure 3 is a cross section through the lower part of a floating station similar to that of Figures 1 and 2 but provided with wall strengthening means.

Referring now to the drawing, the floating station comprises a metal tube 1 divided by a transverse partition 2 into two lengths. The larger portion b is open at its lower end and water is allowed to rise therein up to the height of the transverse partition 2. The upper and small portion a comprises a buoyant chamber and is sub-divided into a number of chambers by further transverse partitions or floors to provide living accommodation, storage space and space for the accommodation of various apparatus necessary for the maintenance and operation of the station. Thus, for example, at the upper extremity of the station, there is provided a signal lantern 3, wireless aerial 4 and fog horn 5. In the uppermost chamber there is provided a wireless transmitter 6 and apparatus 7 for the operation of the signal lantern, fog horn, etc. Suitable windows 8 are provided for admitting light into the various chambers or those of them situated above the level of the highest wave crest likely to be encountered.

The transverse partition 2 is situated below the normal water level and the transverse partition 2¹ immediately above the same and enclosing the lowermost chamber is provided with a manhole 9, whilst the transverse partition 2 is provided with a similar manhole 10. Suitable pumping apparatus designated as a whole by the reference numeral 11 may be employed to pump air into the lowermost chamber and below the transverse partition 2, in the latter case to expel some of the water in the portion b to elevate the station a certain way out of the water when it is possible for a man to pass through the manhole 10 for the purpose of repairing or repainting the underside of the transverse partition 2. As the man will work in compressed air, the lowermost chamber may be used as a decompression chamber. Naturally, the operation of elevating the station will only take place in calm weather.

The station is anchored by anchors which may be spaced around the circumference of the tube 1, and which are carried by anchor chains or cables 16 one of which is shown in Figs. 1 and 2.

When the floating station is used for cable relay purposes, the submarine cables 21 are taken up through the centre of the compartment b and led through the transverse partition 2.

It will be appreciated that the station may be completed with various other apparatus necessary for its successful functioning, for example it may be provided with a crane 23, emergency boat and davits 24 and, if desired, ladders or stairways 26 connecting the various chambers.

In the floating structure according to the invention, the cross-sectional area or diameter of the upper buoyant chamber c between the points e and f gradually diminishes to provide a sloping surface 1¹. The points e and f are desirably substantially equidistant from the normal surface level and the inclination of the sloping surfaces is such that the increase in pressure acting downwardly due to a rising wave is offset or nullified by the upwardly acting pressure exerted on the bottom of the column of water contained in the portion b by the sub-surface wave corresponding to the surface wave setting up the increase in pressure. It will be appreciated that the inclination of the sloping surface 1¹ may be varied according to the estimated height of wave likely to be encountered and the inclination will also be determined to meet particular requirements depending on the length of the submerged portion of the station to counteract the effect of sub-surface waves likely to be encountered at the particular depth.

As the submerged portion of the tube is water-filled it is not subjected to substantial pressures and it need not be unduly massive, nor need complicated strengthening means be provided, but where strengthening is desired, as illustrated in Figure 3, the wall of the tube may, for example, be provided with flanges 30, welded or bolted thereto, from which a number of strands or spokes 31 are taken to central annular plates or rings 32 and suitably strained.

The structure is simple to make, relatively inexpensive to produce and of lasting and robust form, upon which human habitation is more comfortable than on normal lightships or other floating structures, as the motion, due to the waves, is considerably reduced and there is little or no rolling with consequent reduced danger of sudden catastrophe.

The smooth form given to the shell of the structure offers little resistance to wind and waves and, due to its design, the portion b acts as a counterbalance. All the buoyance is obtained at the lower extremity of the column of water contained in the tube so that the change of buoyancy is only that determined by the sub-surface waves which are only a small proportion of the surface waves and even this small change of buoyancy is largely counteracted by the sloping surface in the region of the surface of the water.

As may be seen from the drawing, it is preferred that the transverse partition be curved, but this is not essential and likewise other alterations of details of design or construction may be made without departing from the invention.

I claim:

1. A floating structure which is stable and substantially immobile in agitated water, comprising an elongated substantially tubular body having a water-tight transverse partition subdividing said body into two unequal portions, the larger of said two portions being open-ended and the smaller acting as a buoyant chamber, whereby said body floats in the water in a vertical position in which the open end of its larger portion is submerged, said body having a buoyancy, whereby its top projects to a height exceeding the crest of the greatest possible wave, and a cross-sectional area at a level below the trough of the greatest possible wave which exceeds the cross-sectional area at any level between the trough and the crest of the greatest possible wave to such an extent that, on the passage of a wave crest, the body receives a force in downward direction substantially counteracting the lift effected by the sub-surface wave pressure.

2. A floating structure, as claimed in claim 1, in which the tubular body is of upwardly gradually decreasing cross-sectional area between the level of the trough of the greatest possible wave and the level of the crest of such wave.

3. A floating structure, as claimed in claim 1, in which said tubular body is substantially cylindrical.

4. A floating structure, as claimed in claim 1, in which said tubular body is substantially cylindrical, comprising at least one annular flange in the larger open-ended portion of the cylindrical body, a central element and spoke-like tension members between said flange and central element.

FREDERICK GEORGE CREED.